Figure 1:
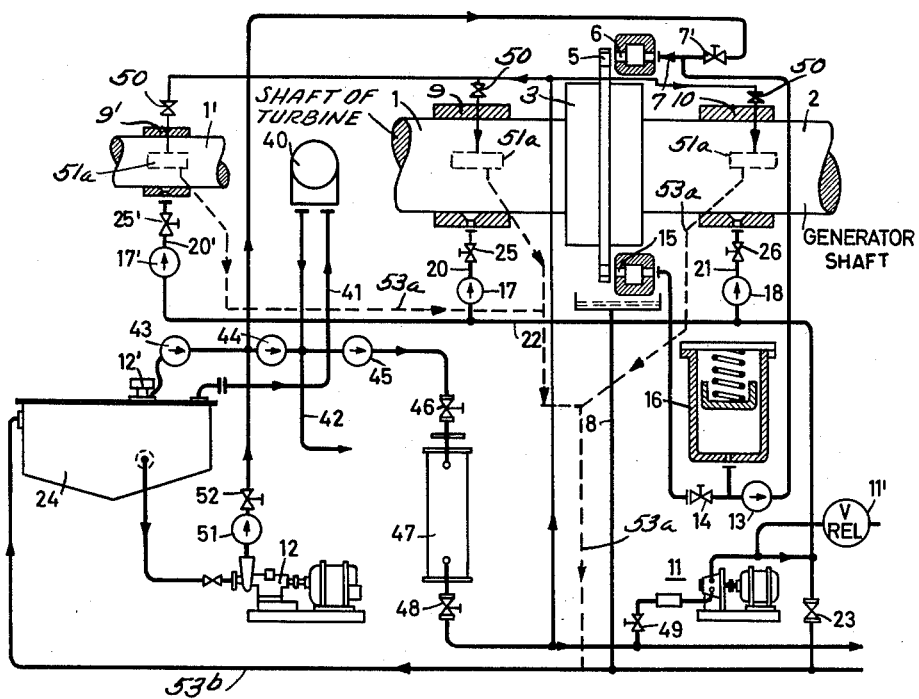

United States Patent Office 2,914,908
Patented Dec. 1, 1959

2,914,908
SHAFT REVOLVING APPARATUS, PARTICULARLY FOR TURBINE GENERATORS

Hans Memmel, Mulhelm (Ruhr), Germany, assignor to Siemens - Schuckertwerke Aktiengesellschaft, Berlin-Siemensstadt, Germany, a corporation of Germany Application November 4, 1954, Serial No. 466,874

Claims priority, application Germany November 9, 1953

14 Claims. (Cl. 60—1)

My invention relates to apparatus for imparting a slow revolving movement to a shaft, particularly for starting the revolution of a turbine shaft so as to overcome starting friction before the turbine commences to drive the shaft.

It is known, for instance from the German Patent No. 322,362, that the revolving movement of a shaft can be started more easily if, prior to starting, the bearings are supplied with oil from a pump at such a pressure that the product of pressure times supporting area in the bearings is about equal to the weight of the shaft in the bearings. The starting friction then drops to the value of the running friction, and the normal operating pressure of the bearings can be attained far below the normal revolving speed of the shaft. In the following, it is presumed that the shaft to be started in this manner is the shaft of a turbine.

A turbine shaft, when starting, frequently also when stopping, and in most cases also during temporary disconnection or the inactivity of the turbine, must be turned at creeping speed in order to prevent deformation.

The conventional shaft-revolving apparatus for such purposes is equipped with worm and spur gears and also with one or several drive motors. In addition, a device is needed for uncoupling the revolving apparatus after termination of its operation. The expenditure in material and space is considerable and increases greatly if the apparatus is to be capable of operating at relatively high revolving speeds.

It is an object of my invention to secure a considerable simplification in design and operation of shaft-revolving apparatus of the above-mentioned kind, utilizing the described principle of relieving pressure in the bearings prior to starting.

To this end, and in accordance with a feature of my invention, I connect the bearings of the turbine shaft or other shaft to be started with oil pressure means for relieving the bearings of the shaft weight, and I provide the shaft with an auxiliary turbine for turning the shaft at slow speed, and I further provide the pressure means and the auxiliary turbine with mutually interlinked control or pressure-supply means so that the auxiliary turbine will operate to turn the shaft when the pressure means are effective.

While, generally, the auxiliary turbine may operate with any driving medium such as steam, air or water, I prefer, according to another feature of the invention, to operate the auxiliary turbine with oil, and I connect that turbine to the same source of oil supply that also supplies the oil for relieving the shaft bearings.

According to still another feature of my invention, relating preferably to turbine-generator sets with a turbine shaft and a generator shaft coaxially interconnected by a coupling, the above-mentioned auxiliary turbine for slowly turning or starting the shaft assembly is structurally joined with, or forms part of, the shaft coupling.

Figure 2:
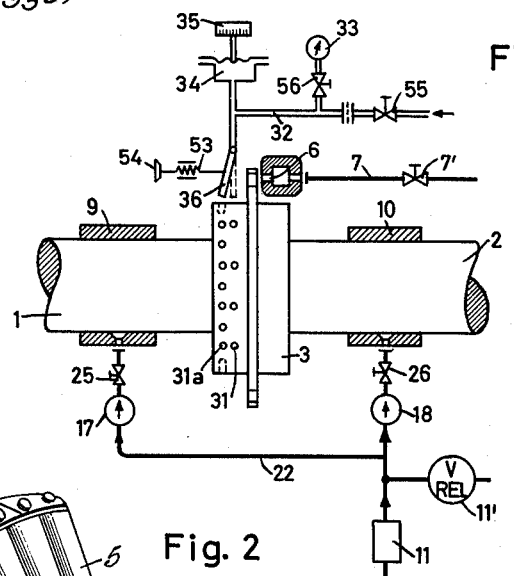
Figure 3:
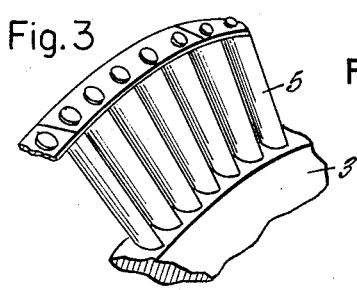

These and more specific objects and features of my invention will be apparent from, and will be set forth in, the following description in conjunction with the drawing, in which:

Fig. 1 shows schematically an embodiment of apparatus according to the invention applied to the shaft assembly of a turbine generator, Fig. 2 shows a modification of part of a shaft-revolving apparatus otherwise similar to that of Fig. 1, and Fig. 3 shows in perspective, a detail of Figs. 1 and 2.

According to Fig. 1, the shaft 1 of a steam turbine is connected with the shaft 2 of a generator by a coupling 3. The shafts 1 and 2 are journalled in respective bearings 9, 10. The turbine shaft 1 is shown to have a portion 1' of smaller cross section journalled in a bearing 9'. The main oil pump 40 of the turbine generator is schematically shown between shaft 1 and shaft portion 1'. Pump 40 delivers oil from a tank 24 through suction line 41 and pressure line 42 to the various bearings and other parts to be lubricated.

Before commencing the operation of the turbine, it is necessary to turn the shaft assembly so as to overcome starting friction. For this purpose, the bearings 9, 10, 9' are relieved from the weight of the shaft assembly by supplying them with oil of high pressure so that purely liquid friction is secured. The oil is supplied from the tank 24 through an electrically driven pump 11 into an oil distributing line 22. The connection from tank 24 to pump 11 extends through check valves 43, 44, 45 and a shut-off valve 46, thence through an oil cooler 47 and shut-off valves 48, 49. The bearings 9, 10, 9' are all parallel connected to the line 22; and line 22 is connected through a pressure-limiting by-pass valve 23 with the tank 24. Respective check valves 17, 18 and 17' are connected in the branch pipes 20, 21 and 20' that connect the respective bearings 9, 10 and 9' with the common oil distributing line 22. The check valves 17, 18 and 17' permit oil to flow under pressure only from line 22 to the respective bearings but prevents oil flow in the reverse direction. Adjustable throttle valves 25, 26 and 25' are shown interposed between the respective bearings 9, 10, 9' and the just-mentioned check valves. The pump 11 is equipped with a spring-loaded relief valve 11'.

The shaft assembly of the turbine generator carries an auxiliary turbine rotor. This auxiliary rotor consists of a ring of turbine blades or buckets 5 (Figs. 1 and 3) and is mounted on the shaft coupling 3. The auxiliary turbine rotor is operated by oil under pressure issuing from nozzles such as the one shown at 6 (Fig. 1). The oil is supplied from tank 24 by means of auxiliary oil pumps 12 and 12' through a check valve 51 and a controllable gate valve 52 in pressure line 7 including a control valve 7'. After impinging upon the ring 5, the oil returns to tank 24 through a return line 8.

In Fig. 1 are also illustrated the bearing lubricating circuits. The normal bearing lubrication lines are shown in full lines and the oil return lines 53a from the bearings are shown by dotted lines. The lubricant for the bearings is supplied from the line connected behind the cooler 47, in parallel connection to the circuit of the pressure-oil relieving line 22 which passes through pump 11. The lubricant for the normal lubrication of the bearings 9 is supplied through adjustable throttle members 50 to lubrication pockets 51a. Pockets 51a may be located, for example, in the bearing separation gap, as is generally customary for the pressure-oil lubrication of turbine bearings. In contrast to the oil for normal lubrication supplied through the pockets 51a, the oil for relieving the bearing load, supplied through the line 22 and the check valves 17, 17', 18 and the further regulating valves 25, 25', 26 are passed into the bearings 9, 9' and 10 through bores in the bearing shell beneath the respective shaft 1, 1' and 2, so that when starting the turbine from standstill, the heavy shaft assembly of the machine set can be lifted by means of the lubricant which is applied through these bores with relatively high pressure. The lubricating liquid which is supplied to the bearings, as well as the load-relieving liquid, is returned by a return-line system 53b into the oil return line which leads to tank 24.

During operation of the apparatus, the weight-relieving effect of the oil pressure in the bearings makes it possible for the simultaneously operating oil-pressure turbine to turn the shaft assembly. In tests made with a heavy shaft assembly of a steam turbine, the shaft bearings were relieved by supplying oil under a pressure of 35 atm. It was found that a torque of approximately 400 cm. kg. was sufficient for turning the shaft by hand. Such and larger torques can very readily be applied by a small auxiliary turbine as described.

The illustrated example exhibits the outstanding simplicity of the apparatus as compared with those heretofore used for such purposes. Gearings with worm gears, spur gears, clutches and similar transmissions are completely obviated, nor is an electric motor with switches, fuses and other auxiliaries required. A special oil safety device is likewise not needed because, when using the auxiliary oil pump 12 for supplying the driving oil to the auxiliary turbine 5, the slow-motion turning operation is possible only when the auxiliary pump 12 is running and in oil-supplying condition. Consequently, any further auxiliaries for the automatic disconnection of the shaft-revolving apparatus are superfluous because, even when the turbine speed should increase beyond the rated speed of the auxiliary oil drive, no appreciable braking force can occur. The ventilator effect of the turbine rotor 5 at full rated speed is negligibly slight. An important advantage is the fact that the spacing between the shaft bearings can be reduced and that the bearings remain readily accessible. As in the case of other turbines, the revolving speed of the auxiliary turbine can be varied and adjusted within certain limits.

Two possibilities may be distinguished with respect to the operation of the apparatus. When the main turbine generator is disconnected from the electric power line, the shaft must continue revolving at creeping speed. Then the apparatus functions as a drive for maintaining such reduced speed, deriving its operation from the continuing revolution of the shaft itself. The second possibility is the condition that the apparatus is to start revolving the shaft from standstill. In this case, the starting friction to be overcome is considerably larger than the friction in the case first considered. For transfer from standstill to motion, a second pump may be provided which increases the driving pressure of the oil and which is disconnected after starting the shaft. The same result, however, can be attained with simpler means by providing the auxiliary turbine with a number of separate starting nozzles and connecting these additional nozzles to an oil-pressure accumulator which supplies the temporarily larger demands in oil pressure. This does away with the necessity of providing a separate pump and reduces the over-all space requirements of the apparatus.

In the illustrated embodiment, one of the additional starting nozzles is denoted by 15. These nozzles are supplied with oil under pressure from the supply line 7 through a check valve 13 and a shut-off valve 14. The temporary operation of nozzles 15, in addition to the simultaneously operating nozzles 6, results in an increase in the demand for oil under pressure. This demand is supplied from a spring-loaded oil accumulator 16. After starting of the shaft, the valve 14 is closed and the accumulator 16 is recharged. The check valve 13 prevents a return flow of accumulator oil if the pressure in line 7 drops below that in the accumulator 16. However, the torque produced by the apparatus should not be made unnecessarily high so that the apparatus cannot cause damage by applying excessive force if the shaft rotation is obstructed, for instance when, due to thermal deformation, the main turbine rotor wipes against the turbine housing.

During operation of a machine set with weight-relieved bearings, but not equipped with the above-mentioned check valves 17, 18 and 17', the following observation was made. Revolution of the machine shaft was started while the pressure relief pump 11 was in operation. The machine then attained a revolving speed at which self-lubrication of the bearing commenced being effective. Thereafter, the drive of the relief pump was disconnected. Nevertheless, the pump kept running. This was so because, during self-lubrication, the oil-delivering action of the shaft in its bearings was so strong that a large amount of oil entered into the pressure line 22 from the self-lubrication film in the bearings; and this oil had sufficient pressure to operate the relief pump 11 as a motor, thus also turning the electric drive motor of that pump. Although no appreciably detrimental effects are to be expected, it appears preferable to prevent such unnecessary oil delivery by mounting the above-mentioned check valves 17, 18, 17' into the relief line, thus preventing the oil from flowing in the reverse direction. Only during pressure relief operation is the oil flow in the relief line 22 directed toward the shaft bearings. After the revolving speed of self-lubrication in each bearing is attained, there is the possibility of a temporary unstable condition until the pressure in the oil film preponderates to close the check valve.

Relative to the pressure conditions occurring in the bearings, a distinction may be made between two stages of operation, namely transfer of the shaft from standstill to revolving motion, and maintenance of the revolving motion once commenced. When starting the revolving operation, the shaft, so to say, must first be broken loose. After standstill, particularly long periods of rest, some sticking of the shaft in the bearings will occur. Consequently, there is initially a relatively large frictional resistance. After this resistance is eliminated, the shaft must float upon the film of lubricating oil. Now, however, the following possibility may occur.

It has been the general opinion that, for precaution, the relief pressure should initially be made as high as possible in order to make sure that floating will actually occur. The result is that although the shaft is lifted reliably and that an oil cushion is formed beneath it, this oil cushion may become so strong that the shaft may metallically touch the top shell of the bearing. This is contrary to the intended purpose. The conditions become especially unfavorable if an independent pump piston is assigned to each individual pressure line leading to the respective bearings. This is so pecause under these conditions it may happen that, due to inevitable discrepancies in clearance within the respective bearings, the oil pressure may build up satisfactorily in one bearing but may become too large in another bearing. It is then necessary to adapt the oil pressure in the respective bearings relative to each other and to provide the possibility of adjusting the pressure to such a magnitude that the shaft will just float but cannot be lifted into metallic contact with the top shell of the bearings. This problem is solved in the illustrated embodiment by having the pressure lines 20, 21, 20' of the individual bearings all connected in parallel to the common distributing line 22 and having the line 22 connected with the oil tank 24 through the by-pass valve 23. This secures the following operation.

When the pressure in one of the parallel-connected lines increases because of smaller clearance in the bearing, then this pressure increase makes itself also felt in the other pressure line. Consequently, by changing the setting of the by-pass valve 23, the pressure in all bearings can be brought back to the most favorable value. Similarly, if one bearing has more clearance than the others so that more oil will drain off, then the pressure will drop in all individual lines and, by means of the by-pass valve, can again be raised to the desired value. In summary, the same pressure condition can be secured in all bearings in the manner just described, and any undesired difference in pressure distribution can thus be equalized.

The provision of the valve 23 by-passing the relief pump 11 for supplying pressure oil to the shaft bearings has the further advantage that it permits setting the apparatus to the most favorable relieving pressure in the bearings. It is generally unfeasible to predict a certain pressure, for instance 30 atm., as most favorable for relieving the shaft weight in the bearings. This uncertainty is due to the fact that the optimum pressure also depends appreciably upon temperature and other conditions. For that reason, it may be necessary to provide a higher relieving pressure, for instance, because the oil is too warm. Or a lower pressure may be required in order to prevent excessive lifting of the shaft in the bearings. Any such pressure adjustments can readily and simply be made with the aid of the by-pass valve 23.

The by-pass valve, however, may serve still another purpose. As mentioned, the shaft assembly after having been at standstill must first be broken loose or unfrozen before being started. This can be done manually, for instance, by turning the shaft assembly like the flywheel of a piston engine. However, much less effort is required when using the by-pass valve 23 for this operation. The relief pump 11 is customarily rated for an oil pressure considerably higher than that actually needed for relieving the shaft weight in the bearings. Hence, when the pump is in operation and the by-pass valve 23 is being shut or very strongly throttled, a very high pressure will rapidly build up in the line system connected to the pump. As a result, an elastic impact is imparted to the shaft in the bearings. If this is not sufficient to loosen the shaft, the by-pass valve is again opened to reduce the pressure and, thereafter, is closed once more. In this manner, the shaft is subjected to a sequence of elastic impacts until it will float in the bearings. This is another, salient advantage of the illustrated apparatus.

In machinery of the kind here involved, the respective shaft bearings have often widely different diameters so that the loads imposed upon the various bearings are likewise different. It may happen, therefore, that the oil pressure is too high in the bearing of smallest diameter so that the shaft is excessively lifted in that bearing. In cases where this may result in unfavorable operating conditions, the pressure supply line for that bearing may include a throttle valve so that the relieving pressure supplied to that bearing is reduced accordingly. The above-described valve 25' in the pressure line 20' for bearing 9' serves the just-mentioned purpose. In the illustrated embodiment, the lines 20 and 21 leading to respective bearings 9 and 10 are also shown equipped with a valve 25 or 26. These additional valves may serve similar pressure adjusting purposes. It should be understood, however, that as a rule, only the bearings of smaller shaft diameter need be equipped with a throttle valve and that, furthermore, such a valve is indispensable only under certain conditions.

For the starting and turning operation, it is of interest to know when the shaft commences to turn and at what speed it will turn. The tachometer usually used with turbine-generator sets is usually rated for speeds of 3000 r.p.m. or 1500 r.p.m. Such a tachometer does not indicate or is unreliable at the low speeds of apparatus for the purposes of the invention. It would be possible to provide the machinery with a special tachometer for starting and creeping-speed operations; but such a tachometer would have to be disconnectible because it cannot be operated at the high speed of normal turbine operation. The use of a manual tachometer is impractical because it can be set only against the shaft end, where the attendant cannot sufficiently supervise the starting and creeping-speed operation of the apparatus. However, these slow speeds can readily be measured if a back-pressure metering device is used whose output delivery is controlled at a regular frequency by protuberances or recesses disposed on the periphery of the revolving shaft assembly. To this end, for instance, the periphery of the revolving assembly may be provided with bores. Instead, the back-pressure measuring device may be equipped with a revolving control body similar to a spur gear. When the plain surface of the periphery or the top of a gear tooth is located opposite the outlet opening of the device, the back pressure increases. When a bore or a tooth gap enters into the range of the outlet opening, the back pressure decreases. When the revolving speed is very small, the number of the pressure pulses thus produced in the measuring device per time unit can be counted. However, the pressure pulses may also be applied directly to an indicating instrument.

It has been mentioned that pressure increase and decrease alternate in the back-pressure measuring device. Due to inertia of the fluid medium emerging from the back-pressure tube, a larger or smaller median value of pressure will adjust itself depending upon the frequency of the pulses; and this average value is directly a measure of the revolving speed. Consequently, a manometer responsive to the median back pressure may be calibrated in speed of revolution. In cases where only a limited range of revolving speeds is involved, the number of pulses issuing per time unit may directly be utilized for indicating revolving speed by designing the measuring instrument as a vibration measuring device such as the conventional tuning-fork frequency indicators.

In certain cases, it may be desired to observe several ranges of revolving speed. It is then not necessary to provide several back-pressure devices but is sufficient to simplify the indicating means by using a single back-pressure device with a selectively adjustable ejector tube. An embodiment incorporating these features is shown in Fig. 2 and described presently.

In an apparatus otherwise designed and operative in accordance with Fig. 1, the coupling 3 between the turbine shaft 1 and the generator 2 is provided with two peripheral rows of bores 31 and 31a, the respective number of bores being different in the two rows. An angularly displaceable jet-nozzle tube 36 can be placed into registry with one or the other of these two rows and communicates with a back-pressure line 32 to which a manometer 33 is connected. Such displacement of the nozzle tube 36 is effected by means of a screw spindle 53, operated by a hand wheel 54. Shut-off valves are located at 55 and 56. Connected with line 32 is a pressure capsule 34 which is joined with a frequency indicator 35 of the tuning-fork type. When a pressure medium is supplied to pipe 32 and issues from the nozzle opening of tube 36, the alternating passage of a bore in front of the nozzle opening causes a periodic back pressure to occur in capsule 34. The frequency of the pressure variations, indicated by instrument 35, is a measure of the revolving speed. By setting the nozzle tube 36 to another row of bores, the range of indication can be changed, due to the different mutual spacing of the bores in the respective rows.

It will be obvious to those skilled in the art, upon a study of this disclosure, that apparatus according to my invention are amenable to various modifications including embodiments other than those specifically illustrated and described, without departing from the essential features of my invention and within the scope of the claims annexed hereto.

I claim:

1. With a turbine shaft assembly having two coaxially aligned shafts, bearings for said shafts, and a coupling interconnecting said shafts, the combination of apparatus for imparting slow revolution to said shaft assembly, said apparatus comprising an auxiliary turbine having a rotor structurally joined with said coupling, oil pressure lines connected with said respective bearings for relieving said bearings of the shaft weight, and pressure control means connected with said auxiliary turbine and with said pressure lines for simultaneously operating said pressure lines and said auxiliary turbine.

2. With a turbine shaft and bearings in which said shaft is revolvable, the combination of apparatus for imparting slow revolution to said shaft, said apparatus comprising oil pressure lines connected with said respective bearings for compensating the shaft weight, an auxiliary turbine having a rotor drivingly connected with said shaft and having two sets of stationary nozzles for coaction with said rotor, pressure oil supply means connected with said pressure lines and with said nozzles, booster means interposed between said nozzles and said supply means, and control means for causing said booster means to temporarily increase the torque of said auxiliary turbine when starting said shaft.

3. With a turbine shaft and bearings in which said shaft is revolvable, the combination of apparatus for imparting slow revolution to said shaft, said apparatus comprising oil pressure lines connected with said respective bearings for compensating the shaft weight, an auxiliary turbine having a rotor drivingly connected with said shaft and having two sets of stationary nozzles for coaction with said rotor, pressure oil supply means connected with said pressure lines and with said two sets of nozzles, an oil-accumulating booster interposed between said supply means and one of said sets of nozzles, and control means connected with said booster for temporarily operating said one set of nozzles together with said other set for increasing the starting torque of said auxiliary turbine.

4. With a main turbine shaft assembly of a turbine plant and bearings in which said shaft assembly is journalled, the combination of apparatus for imparting creeping speed to said shaft assembly independently of the main turbine to prevent deformation stresses during inactive periods of the plant, said apparatus comprising oil pressure lines connected with said respective bearings for compensating the shaft weight, an auxiliary turbine in driving connection with said shaft assembly and having stationary oil nozzle means coacting with said auxiliary turbine for driving same, oil supply means connected with said pressure lines, and control means connected with said supply means and with said auxiliary turbine for operating said auxiliary turbine with the weight of its shaft in the bearings so compensated, another oil line connecting said nozzle means with said oil pressure lines for supply of oil to said nozzle means, and valve means in said other oil line for controlling said supply, the auxiliary turbine having a torque rating sufficient to turn the shaft assembly at creeping speed but being rated for a maximum turning speed substantially less than the normal operating speed of the main turbine.

5. With a main turbine shaft of a steam turbine plant and bearings in which said shaft is revolvable, the combination of apparatus for imparting creeping speed to said shaft assembly before the main turbine commences to drive the shaft assembly, to prevent deformation stresses during inactive periods of the plant, said apparatus comprising oil pressure lines connected with said respective bearings for compensating the shaft weight, an auxiliary oil turbine mounted on said shaft and having stationary oil nozzle means coacting with said auxiliary turbine for driving same, oil supply means connected with said pressure lines and with said turbine for operating said auxiliary turbine with the weight of its shaft in the bearings so compensated, another oil line connecting said nozzle means with said oil pressure lines for supply of oil to said nozzle means, and valve means in said other oil lines for controlling said supply, the auxiliary turbine having a torque rating sufficient to turn the shaft assembly at creeping speed but being rated for a maximum turning speed substantially less than the normal operating speed of the main turbine.

6. With a main turbine shaft assembly of a steam turbine plant and bearings in which said shaft assembly is journalled, the combination of apparatus for imparting creeping speed to said shaft assembly before the main turbine commences to drive the shaft assembly, to prevent deformation stresses during inactive periods of the plant, said apparatus comprising oil pressure lines connected with said respective bearings for compensating the shaft weight, an auxiliary turbine in driving connection with said shaft assembly and having stationary oil nozzle means coacting with said auxiliary turbine for driving same, oil supply means connected with said pressure lines, another oil line connecting said nozzle means with said oil pressure lines for supply of oil to said nozzle means, and valve means in said other oil line for controlling said supply, and control means connected with said supply means and with said nozzle means for operating said auxiliary turbine with the weight of its shaft in the bearings so compensated, the control means being capable of maintaining creeping speed for any desired duration, and including valve means capable of being closed to cut off the supply of oil operating the auxiliary turbine when the main turbine commences to drive the shaft assembly.

7. With a main turbine shaft of a steam turbine plant and bearings in which said shaft is revolvable, the combination of apparatus for imparting creeping speed to said shaft assembly independently of the main turbine to prevent deformation stresses during inactive periods of the plant, said apparatus comprising oil pressure lines connected with said respective bearings for compensating the shaft weight, an auxiliary oil turbine mounted on said shaft and having stationary oil nozzle means coacting with said auxiliary turbine for driving same, oil supply means connected with said pressure lines and with said nozzle means for operating said auxiliary turbine with the weight of its shaft in the bearings so compensated, the auxiliary turbine having a torque rating sufficient to turn the shaft assembly at creeping speed but being rated for a maximum turning speed substantially less than the normal operating speed of the main turbine, the control means being capable of maintaining creeping speed for any desired duration at will, and having oil lines interconnected for conjointly turning on the oil pressure supply to the bearings and to the nozzle of said auxiliary turbine to slowly turn the shaft.

8. In a main turbine shaft and shaft bearing assembly, the improvement comprising an auxiliary turbine and an oil supply system for conjointly supplying oil under pressure to the under part of the bearings to relieve the shaft weight on the bearings and to the auxiliary turbine to slowly turn the so relieved shaft at creeping speed for any desired duration of time at will, before the main turbine is started, to avoid deformation stresses during inactive periods of the main turbine, the auxiliary turbine having nozzle means connected to said oil supply system and adapted to turn the turbine shaft as recited, said auxiliary turbine turning at the same number of revolutions per minute as the shaft, said oil supply system including pump means for delivering oil under pressure to the bearings and pump means to supply oil under pressure to said nozzle means to operate the auxiliary turbine, and means for controlling the oil supplied by the latter pump means to determine the duration of and speed of turning the shaft by the auxiliary turbine, at will, independently of the duration of the relief of shaft weight, and to permit the interruption of application of oil pressure motivating force to the auxiliary turbine when the main turbine commences operation.

9. With a main turbine shaft assembly and bearings in which said shaft assembly is journalled, the combination of apparatus for imparting slow revolution to said shaft assembly, said apparatus comprising oil pressure lines connected with said respective bearings for compensating the shaft weight, an auxiliary turbine in driving connection with said shaft assembly, oil pressure supply means connected with said pressure lines, and control means connected with said supply means and with said auxiliary turbine for operating said auxiliary turbine simultaneously with application of pressure to said pressure lines, said oil pressure supply means comprising an oil tank, a pump having an inlet connected with said tank and having an outlet, and an oil distributing line connected to said outlet, said pressure lines being connected to said distributing line in parallel relation to each other, and an adjustable by-pass valve connecting said distributing line with said tank.

10. With a main turbine shaft assembly and bearings in which said shaft assembly is journalled, the combination of apparatus for imparting slow revolution to said shaft assembly, said apparatus comprising oil pressure lines connected with said respective bearings for compensating the shaft weight, an auxiliary turbine in driving connection with said shaft assembly, oil pressure supply means connected with said pressure lines, and control means connected with said supply means and with said auxiliary turbine for operating said auxiliary turbine simultaneously with application of pressure to said pressure lines, said oil pressure supply means comprising a distributing line to which said pressure lines are connected in parallel relation to each other, an oil tank, a pump connecting said tank with said distributing line to supply oil under pressure to said distributing line, an adjustable by-pass valve connecting said distributing line with said tank, said shaft bearings having respectively different diameters, and a throttle valve disposed in the oil pressure line leading from said distributing line to one of said bearings of smaller diameter.

11. A turbine plant, comprising a main turbine shaft, bearings in which said main shaft is journalled, oil-pressure lubricating means having an oil circulation system connected with said bearings for lubricating them, an auxiliary pressure-oil turbine for continuously slowly turning said main shaft at creeping speed for extended periods of time to prevent deformation during inactive periods of the plant, said auxiliary turbine having an oil-turbine wheel mounted on said shaft and having stationary oil nozzle means coacting with said wheel, an oil line connected in parallel with said oil circulation system lubricating said bearings and thus connecting said nozzle means with said oil circulation system for supply of oil from said system to said nozzle means, and valve means in said line for controlling said supply.

12. A turbine plant, comprising a main turbine shaft, bearings in which said main shaft is journalled, oil-pressure lubricating means having an oil circulation system connected with said bearings for lubricating them, an auxiliary pressure-oil turbine for continuously slowly turning said main shaft at creeping speed for extended periods of time to prevent deformation during inactive periods of the plant, said auxiliary turbine having an oil-turbine wheel mounted on said shaft and having stationary oil nozzle means coacting with said wheel, an oil line connected in parallel with said oil circulation system lubricating said bearings and thus connecting said nozzle means with said oil circulation system for supply of oil from said system to said nozzle means, and valve means in said line for controlling said supply and for permitting the oil pressure to said nozzle means to be cut off when said main turbine commences operation.

13. A turbine plant, comprising a main turbine shaft, bearings in which said main shaft is journalled, oil-pressure lubricating means having an oil supply tank and an oil circulation system connected with said bearings for lubricating them, an auxiliary pressure-oil turbine for slowly turning said main shaft continuously at a creeping speed which is a small fraction of the normal rotating speed of said main turbine shaft to prevent deformation of said shaft during inactive periods of the plant, said auxiliary turbine having an oil-turbine wheel mounted on said shaft and having stationary oil nozzle means coacting with said wheel, said oil circulation system having oil lines and valve means controlled optionally for simultaneously supplying oil under pressure to the under part of the bearings to relieve the shaft weight on the bearings and to said oil nozzle means of said auxiliary turbine to slowly turn the so-relieved shaft at creeping speed and also optionally to shut off the supply of oil to the under part of the bearings while maintaining the supply of oil to said nozzle means, said oil circulation system including first pump means for delivering oil under pressure to said bearings and second pump means to supply oil under pressure to said nozzle means to operate the auxiliary turbine, and by-pass valve means connected to said supply tank and connected in parallel to said bearings and by-passing said first pump means, for relieving excessive pressure in said bearings and for causing pressure surges from said first pump means for breaking loose said shaft from standstill.

14. With a turbine shaft assembly having two coaxially aligned shafts, bearings for said shafts, and a coupling interconnecting said shafts, the combination of apparatus for imparting slow revolution to said shaft assembly, said apparatus comprising an auxiliary turbine having a rotor structurally joined with said coupling, oil pressure lines connected with said respective bearings for relieving said bearings of the shaft weight, and pressure control means connected with said auxiliary turbine and with said pressure lines for simultaneously operating said pressure lines and said auxiliary turbine, and means optionally operable for shutting off the supply of oil to said shaft-weight relieving oil pressure lines while maintaining the operation of said auxiliary turbine.

References Cited in the file of this patent

UNITED STATES PATENTS

| | | |
|---|---|---|
| 1,613,727 | Schmidt | Jan. 11, 1927 |
| 2,245,175 | Bany | June 10, 1941 |
| 2,661,813 | Kennedy | Dec. 8, 1953 |
| 2,742,758 | Kelly | Apr. 24, 1956 |

FOREIGN PATENTS

| | | |
|---|---|---|
| 1,046,697 | France | July 15, 1953 |
| 210,708 | Germany | June 8, 1909 |